Figure 1:
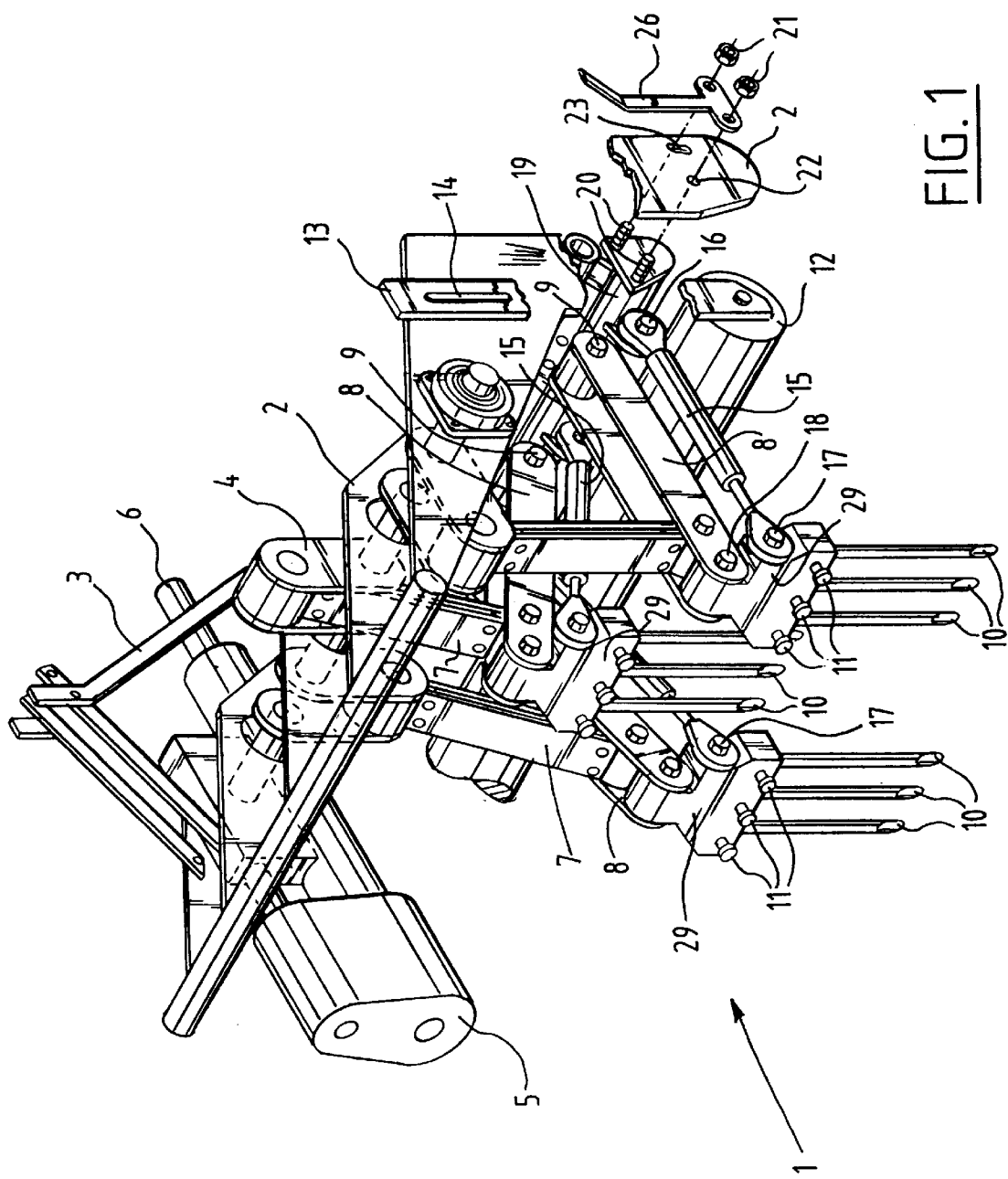

United States Patent [19]

Reincke

[11] Patent Number: 6,003,613
[45] Date of Patent: Dec. 21, 1999

[54] APPARATUS FOR AERATING A GROUND LAYER

[75] Inventor: Marinus Reincke, Leersum, Netherlands

[73] Assignee: Redexim Handel-en Exploitatiemaatschappij, Zeist, Netherlands

[21] Appl. No.: 09/002,777

[22] Filed: Jan. 5, 1998

[30] Foreign Application Priority Data

Jan. 3, 1997 [NL] Netherlands ............................ 1004926

[51] Int. Cl.⁶ ................................................. A01B 45/02
[52] U.S. Cl. .................................. 172/21; 172/94; 172/95
[58] Field of Search ................................ 172/21, 22, 95, 172/94

[56] References Cited

U.S. PATENT DOCUMENTS

| 4,236,582 | 12/1980 | Hastings | 172/22 |
| 4,602,687 | 7/1986 | Hansen | 172/22 |
| 5,570,746 | 11/1996 | Jones et al. | 172/22 |

FOREIGN PATENT DOCUMENTS

| 0 037 595 | 10/1981 | European Pat. Off. |
| 2 625 405 | 7/1989 | France . |
| 86 05 222 | 5/1986 | Germany . |
| 43 23 315 | 1/1995 | Germany . |
| 43 33 310 | 4/1995 | Germany . |
| 661287 | 11/1951 | United Kingdom . |
| WO 89/12381 | 12/1989 | WIPO . |

*Primary Examiner*—Christopher J. Novosad
*Attorney, Agent, or Firm*—Evenson, McKeown, Edwards & Lenahan, P.L.L.C.

[57] ABSTRACT

The invention relates to an apparatus for aerating a ground layer including a frame movable along a ground surface and a number of substantially vertically placed aerating pins movable in and out of the ground layer. Each pin is engaged by a pivot arm mounted on the frame for pivoting, and a guide arm is connected to the frame at a distance from the position where the pivot arm engages the frame. A drive element is provided for causing reciprocal pivoting of the pivot arm during the movement of the apparatus along the ground layer. The connections of the pivot arm to the frame and the aerating pin and the connections of the guide arm to the frame and the aerating pin substantially form corners of a parallelogram in the non-loaded state of the aerating pin. At least one of the sides of this parallelogram is changeable in length such that the bottom part of the pin is displaced relative to the top part of the pin in a direction opposed to the direction of movement of the frame. All pivot arms and guide arms engage the frame by way of a central engaging member, the position of which is adjustable relative to the frame.

10 Claims, 3 Drawing Sheets

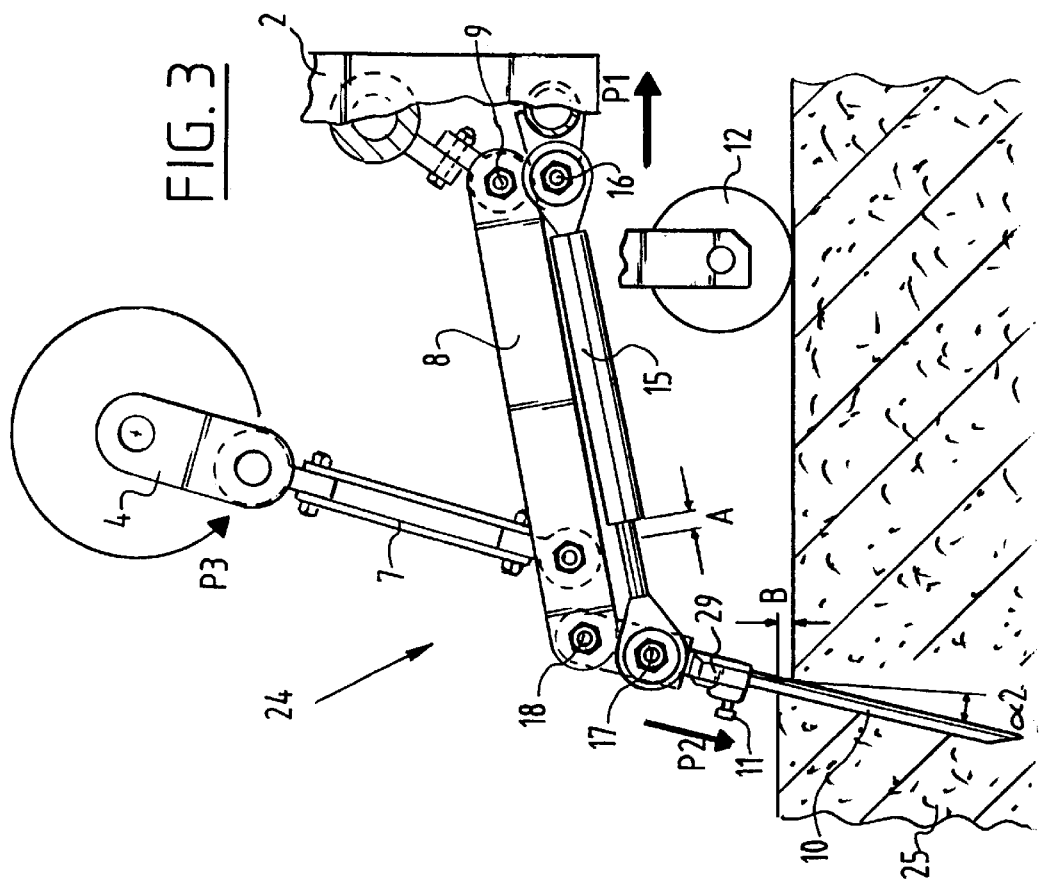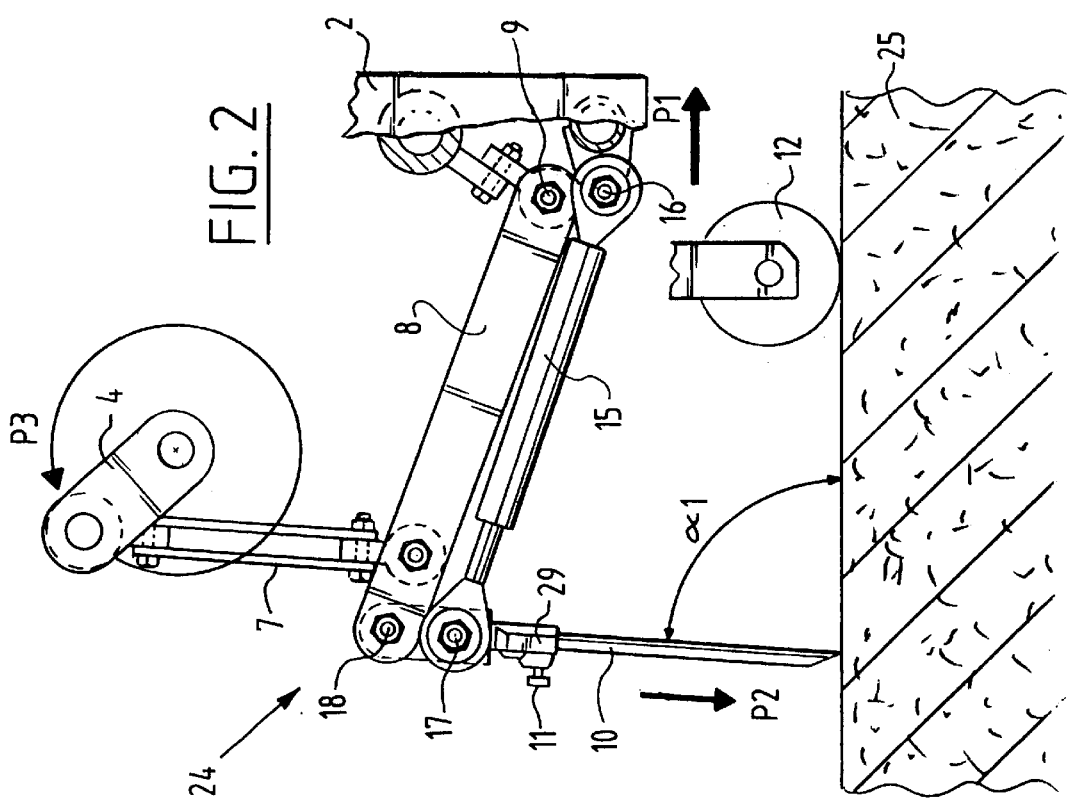

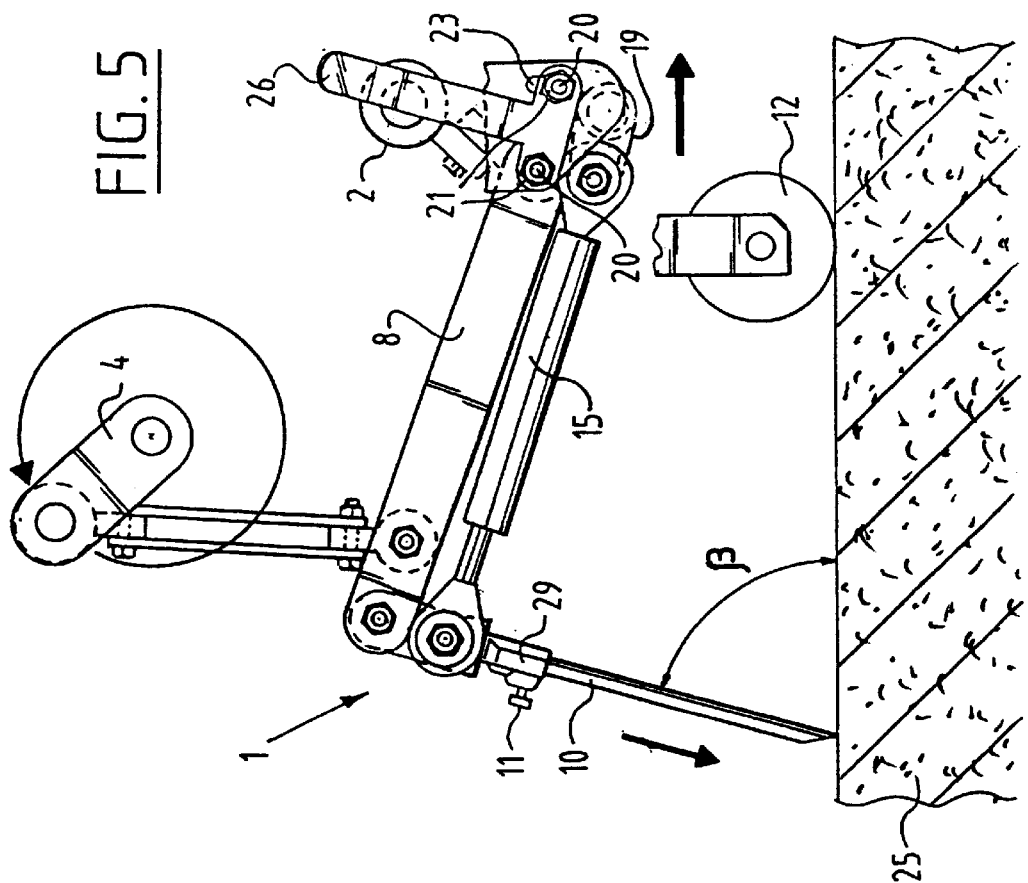
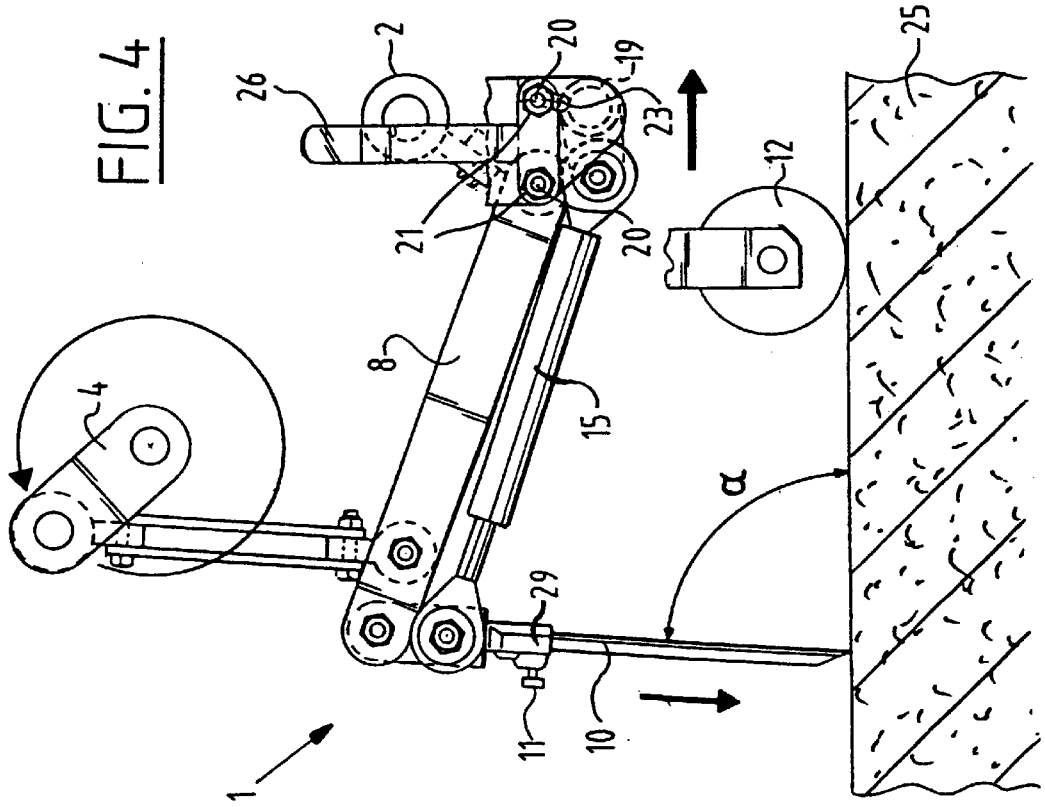

APPARATUS FOR AERATING A GROUND LAYER

The invention relates to an apparatus for aerating a ground layer with which aerating pins can be inserted into the ground which then make a so-called levering movement.

The ground of cultivated land such as recreation areas and also the ground of non-cultivated land such as woodlands are subject to compaction. This compaction results on the one hand in natural manner and on the other through use or maintenance of the land in question.

In natural compaction can be envisaged the silting up of the micro-soil structures by for instance water, while non-natural compaction occurs through use of these land areas for instance by walking or riding and by maintenance wherein use is made of maintenance machines which close under pressure the small pores in the soil with their weight. For healthy growth on the soil it may be desirable in particular cases to aerate the soil.

Different types of aerating technique exist, some of which damage the surface of the soil for aerating. An example hereof is deep-ploughing. Deep aeration with aerating pins causes hardly any surface damage, which is particularly desirable in determined situations. This technique makes use of an apparatus with which an aerating pin is inserted into a ground surface for aerating, whereafter particularly the bottom part of the aerating pin is moved. The ground surface hereby suffers minimal damage while the soil under the ground surface is aerated considerably. Such a machine is known inter alia from the German Offenlegungsschrift 4 333 310.

For good operation of the aerating apparatus it is of great importance that the angular position at which the aerating pins penetrate the ground is precisely controlled. The substantially parallelogram-shaped construction of the engaging means of the aerating pin ensure a practically constant insertion angle of the aerating pin into the ground irrespective of the insertion depth.

The present invention has for its object to provide an improved aerating apparatus, of which the insertion angle of the aerating pin does not depend on the insertion depth and which insertion angle is also adjustable.

The invention provides for this purpose an apparatus as according to claim 1. By altering the engaging positions of the guide arm and/or the pivot arm on the frame, the angular position of the aerating pin can be changed in a preferred embodiment on one side of the substantially parallelogram-shaped construction. By changing this one side of the substantially parallelogram-shaped construction the angular position of the side formed by the aerating pin will also change. A proviso here of course is that the mutual distance between the connecting points of the pivot arm and guide arm onto the frame do not, or practically do not, change. This can be realized for instance by fixing the mutual distance between both connecting points by fixing them both rigidly on a central engaging member. Another advantage of a central engaging member lies in the fact that the existing aerating apparatus generally have a large number of pivot arms and guide arms which can all be adjusted simultaneously by means of a central engaging member. Using the apparatus according to the invention the insertion angle of the aerating pin can be altered without this imposing limitations in respect of the adjustability of the insertion depth of the aerating pin. A preferred embodiment of the central engaging member is formed by a displaceable, for instance pivotable, plate which can be coupled in multiple positions to the frame. For simple monitoring of the adjusted position of such a central engaging member it is preferably provided with display means.

For simple mounting of the aerating pins it is desirable to connect the aerating pin to the pivot arm and/or the guide arm via a pin holder. For simple insertion depth adjustment of the aerating pin the frame is provided on the side facing the ground with a support roller, the distance of which to the frame is adjustable.

Simple driving of the pivot arm can be realized in that the drive means comprise a driven crankshaft, which crankshaft is coupled to the pivot arm via a drive arm.

For good operation of the aerating apparatus the aerating pin must be pivotable when it is inserted into the ground. For this purpose it must be possible for the engaging construction of the aerating pin, which in the non-loaded state is substantially parallelogram-shaped, to change shape in the loaded state of the aerating pin. Possible solutions herefor are obtained by giving the pivot arm or the guide arm a form which can be shortened or lengthened counter to a bias. Another possible embodiment of the pivot arm and/or the guide arm is formed by a composite folding arm which can be changed in length counter to a bias. Yet another embodiment of the pivot arm or the guide arm is formed by a guide track arranged in the frame and a cam co-acting with the guide track and rigidly connected to the aerating pin. In this latter embodiment it is therefore no longer really possible to speak of an arm but of a construction which replaces the arm but which is technically its equivalent.

In yet another preferred embodiment of the aerating apparatus the length of the pivot arm and/or the guide arm can be calibrated separately. Using at least one arm which can be calibrated the position of an individual aerating pin can be calibrated relative to an aerating pin carried by other arms. In this manner dimensional tolerances in the individual components of the apparatus can be eliminated. Another possibility is to adjust the aerating pins of the aerating apparatus such that the angular position of different pins varies. This may for instance be desirable in aerating the soil of an orchard or vineyard, where aeration of the soil close to the crop must differ from the aeration at a greater distance from the crop. A drawback here of course is that the parallelogram-shaped mounting construction of some of the aerating pins will herein be lost.

A final preferred embodiment of the aerating apparatus is characterized in that the connecting points of the pivot arm and/or the connecting point of the guide arm to the central engaging member is/are adjustable. By making such a connecting point adjustable it is possible to calibrate the aerating apparatus and the angular position of individual pins can be varied without the parallelogram-shaped mounting construction of the pins thereby being lost. Using this latter preferred embodiment the advantages described in the foregoing paragraph can be realized without above-ground variation in the angular position of the aerating pins.

The present invention will be further elucidated with reference to the non-limitative embodiment shown in the following figures, wherein:

FIG. 1 shows a perspective view of a part of an aerating apparatus according to the invention, FIG. 2 shows a side view of the aerating apparatus according to the prior art at the moment of insertion of the aerating pin, FIG. 3 is a side view of the aerating apparatus shown in FIG. 2, wherein the aerating pin is inserted into the ground, FIG. 4 is a side view of the aerating apparatus shown in FIG. 1 in a position corresponding with the position of the aerating apparatus shown in FIG. 2, and FIG. 5 is a side view of the aerating apparatus shown in FIG. 4 wherein the insertion angle of the aerating pin is altered relative to the position shown in FIG. 4.

FIG. 1 shows an aerating apparatus 1 comprising a frame 2 which can be coupled to a vehicle (not shown) by means of a three-point suspension 3. Incorporated in frame 2 is a crankshaft 4 which is driven via a gearbox by the vehicle by means of a power take-off 6. Gearbox 5 can take a variable form, thus enabling optimum adaptation to the tractive vehicle.

Crankshaft 4 is coupled to pivot arms 8 via drive arms 7. Pivot arms 8 are pivotally connected by means of a pivot point 9 to the frame 2. On the side of pivot arms 8 remote from frame 2 these arms 8 are pivotally coupled to pin holders 29 in which different types of pin 10 are mountable. Pins 10 are anchored in pin holders 29 by means of bolts 11. Through rotation of crankshaft 4 the drive arms 7 will move the pins 10 upward and downward, whereby they are inserted into the ground. For guiding of frame 2 along the ground it is provided on the underside with a support roller 12 with which the apparatus 1 supports on the ground. For adjustment of the insertion depth of pins 10 the position of support roller 12 is adjustable relative to frame 2. For this purpose support roller 12 is bearing mounted on a roller support 13 in which is arranged a slot 14. By means of the slot 14 the roller support 13 can be coupled at an adjustable position to frame 2 via coupling means.

Located under pivot arms 8 are guide arms 15 which are connected to frame 2 for pivoting on the one side round a shaft 16 via a central engaging member 19. On the side remote from frame 2 the guide arms 15 are connected to pin holders 29 for pivoting round a shaft 17. These pin holders 29 are coupled at a distance from shafts 17 to pivot arms 8 for pivoting round shafts 18. Shafts 9,16,17 and 18 with which pivot arm 8 and guide arm 15 are connected to frame 2 and pin holder 11 form a substantially parallelogram-shaped construction. On displacement of pivot arm 8 and the simultaneous displacement of guide arm 15 the orientation of pin holder 29 and the aerating pin 10 coupled thereto will thereby not change, at least as long as this latter is not loaded. In the loaded situation of an aerating pin 10, i.e. when it is inserted into the ground, a force will be exerted on pin 10 whereby counter to a bias the guide arm 15 will become longer. That is, the angular position of aerating pin 10 will change. These aspects will be further elucidated with reference to FIG. 2–5.

Guide arms 15 engage by means of rotation shafts 16 onto the central engaging member 19 which is fixed to frame 2 by means of bolts 20 and nuts 21. One bolt 20 is herein received in a hole 22 and the other bolt 20 in slotted hole 23. With a handle 26 the angular position of central engaging member 19 can be placed in a different position once the nuts 21 have been loosened. Once the desired angular position of central engaging member 19 has been obtained, the nuts 21 must be re-tightened. By changing the angular position of engaging member 19 the angular position of pin holders 29 also changes and therefore also that of the pins 10. The insertion angle of pins 10 can thus be changed. As variant of the shown construction, it is of course also possible that, in addition to the guide arms 15, the pivot arms 8 also engage on central engaging member 19 by means of rotation shafts 16.

FIG. 2 shows a cross-section through an aerating apparatus 24 wherein pivot arm 8 and guide arm 15 are coupled directly to frame 2. During movement above the ground 25 the orientation of the aerating pin, i.e. the insertion angle $\alpha_1$, will not change due to the substantially parallelogram-shaped arrangement of shafts 9,16,17,18 as shown in FIG. 2. The apparatus 24 is moved over the ground 25 as according to arrow P1 and the insertion movement takes place in the direction according to arrow P2 when the movement of crankshaft continues further as according to arrow P3. This situation is shown in FIG. 3.

FIG. 3 shows the position of apparatus 24 in which pin 10 is pressed into the ground. During driving of the pin 10 into the ground the frame 2 is moved further in forward direction as according to arrow P1. The angle which the pin makes with the ground is changed as according to angle $\alpha_2$ relative to the position of aerating pin 10 as shown in FIG. 2. This angular displacement $\alpha_2$ in the ground causes a breaking action in the ground 25 whereby the worked soil 25 rises at the rear with a value b. The magnitude of the angular displacement $\alpha_2$ and the ground elevation b is determined inter alia by the insertion angle $\alpha_1$ (FIG. 2), the forward speed b1 and the geometry of the individual components. In order to enable the angular displacement $\alpha_2$ of aerating pin 10, the length of guide arm 15 must increase. This extension A is possible in that the guide arm can be lengthened counter to a spring tension. That is, after pin 10 is removed from the ground 25 the guide arm 15 will regain its original length, whereby the orientation of pin 10 will again be the same as that shown in FIG. 2. Instead of an extensible guide arm 15 it is also possible to give pivot arm 8 a compressible. i.e. shortenable, form. The same effect can hereby be realized.

The drawback to the apparatus as shown in FIGS. 2 and 3 is that heretofore when the insertion angle $\alpha_1$ was changed the length of guide arm 15 was changed. This results in a further deviation from the parallelogram-shaped relation of shafts 9,16,17,18, whereby an adjustment of the insertion depth, i.e. the position of support roller 12, results directly in a different insertion angle. This is undesirable.

FIGS. 4 and 5 show a side view of the aerating apparatus 1 according to the invention in which a central engaging member 19 is arranged adjustably in frame 2. The guide arm 15 engages on central engaging member 19. By changing the orientation of the central engaging member the angular position $\alpha$ of the pin as shown in FIG. 4 will also change to for instance an angular position $\beta$ as shown in FIG. 5. For simple change of the orientation of central engaging member 19 a handle 26 is provided with which central engaging member 19 is engaged. It will be apparent that central engaging member 19 is only displaceable when it is not fixed rigidly in frame 2, i.e. only after bolts 21 have been loosened. After the desired angular position of aerating pin 10 has been reached the bolts 21 must be re-tightened. Changing of the angular position of aerating pin 10 such as takes place in this apparatus 1 has the advantage that the insertion angle ($\alpha$, $\beta$) is adjustable in a manner such that the orientation of aerating pin 10 above the ground 25 remains everywhere the same. The significant advantage is hereby obtained that the insertion angle remains the same irrespective of the insertion depth, i.e. irrespective of the position of support roller 12 relative to frame 2. Another significant advantage obtained is that the insertion angle of a plurality of aerating pins 10 can be changed simultaneously in exactly the same way even when the apparatus 1 comprises a plurality of pivot arms 8 and guide arms 15. These therefore no longer have to be adjusted individually in order to change the angular position of aerating pins 10.

What is claimed is:

1. Apparatus for aerating a ground layer, comprising:
   a frame movable along a ground surface, a central engaging member which is fixed to the frame,
   a number of substantially vertically placed aerating pins movable into the ground surface, at a selected insertion angle, and out of the ground surface, pivot arms mounted between the frame and the pins for pivoting relative to the frame, guide arms substantially parallel to the pivot arms and connected to the central engaging member at distances from positions at which the pivot arms are connected to said frame, drive means for causing reciprocal pivoting of the pivot arms during movement of the apparatus along the ground surface, first and second connections at ends of the pivot arms by which the pivot arms are connected to the frame and the aerating pins, respectively, and third and fourth connections at ends of the guide arms by which the guide arms are connected to the central engaging member and the aerating pins, respectively, each of the guide arms being changeable in length against a biasing force such that bottom parts of the pins are displaced relative to top parts of the pins in a direction opposed to a direction of movement of the frame, wherein the central engaging member can be loosened relative to the frame so as to have an angular position which is adjustable relative to the frame in order to simultaneously change relative positions of said first, second, third and fourth connections and alter said insertion angle.

2. Aerating apparatus as claimed in claim 1, wherein the central engaging member is formed by a pivotable plate which can be coupled in multiple positions to the frame.

3. Aerating apparatus as claimed in claim 2, and further comprising a support roller provided on a side of the frame facing the ground.

4. Aerating apparatus as claimed in claim 1, and further comprising pin holders by which the aerating pins are connected to the pivot arms and the guide arms.

5. Aerating apparatus as claimed in claim 4, and further comprising a support roller provided on a side of the frame facing the ground.

6. Aerating apparatus as claimed in claim 1, and further comprising a support roller provided on a side of the frame facing the ground.

7. Aerating apparatus as claimed in claim 1, wherein the drive means comprise driven crankshafts coupled to the pivot arms via drive arms.

8. Aerating apparatus as claimed in claim 1, wherein the guide arms can be shortened against said biasing force.

9. Aerating apparatus as claimed in claim 1, wherein the guide arms can be lengthened against said biasing force.

10. Aerating apparatus as claimed in claim 1, wherein the frame includes a guide track arranged therein and said central engaging member defines a cam co-acting with the guide track.

* * * * *